O. J. MIKKELSON.
TIRE CHAIN AND GUARD.
APPLICATION FILED NOV. 6, 1911.
1,018,206.
Patented Feb. 20, 1912.
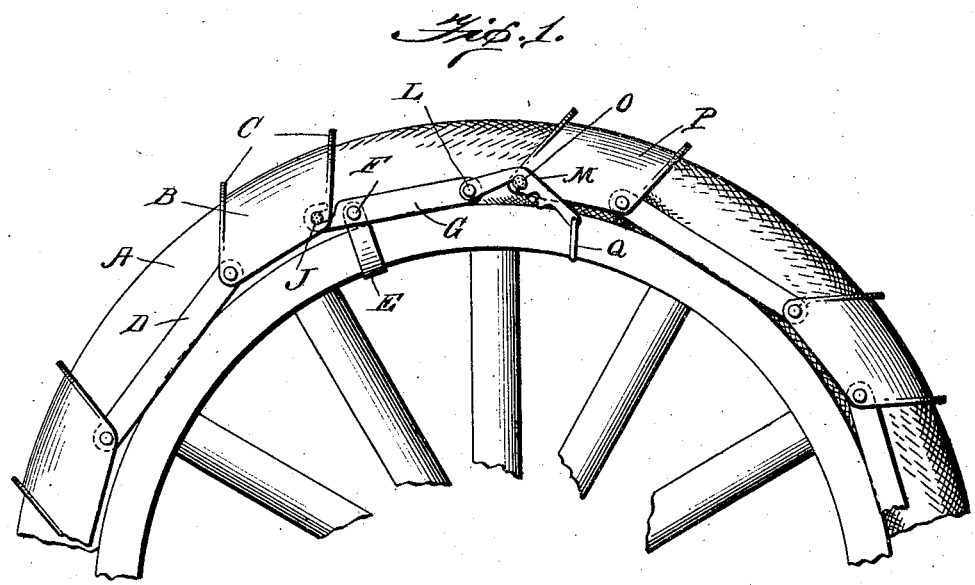
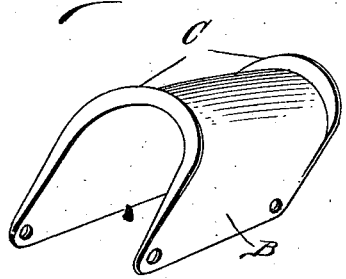
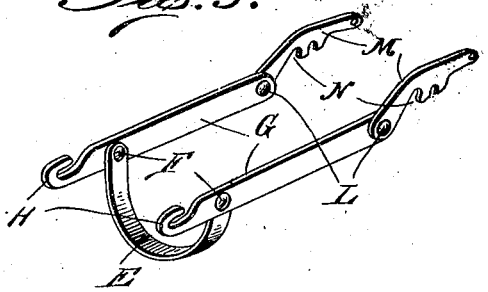
Ole J. Mikkelson
Inventor
Witnesses
By Wm. A. Moore
Attorney

UNITED STATES PATENT OFFICE.

OLE J. MIKKELSON, OF FERRYVILLE, WISCONSIN.

TIRE CHAIN AND GUARD.

1,018,206.     Specification of Letters Patent.     Patented Feb. 20, 1912.

Application filed November 6, 1911. Serial No. 658,770.

*To all whom it may concern:*

Be it known that I, OLE J. MIKKELSON, a citizen of the United States, residing at Ferryville, in the county of Crawford and State of Wisconsin, have invented certain new and useful Improvements in Tire Chains and Guards, of which the following is a specification.

My invention relates to improvements in tire chains or guards and refers particularly to such appliances as are used upon tires to prevent slipping or what is known as skidding.

The object of my invention is the provision of means which can be readily placed upon the tire and which are capable of adjustment to tires of various sizes and which will be of the proper flexibility but which will have a biting action upon the road or surface to prevent slipping of the tire.

Another object of my invention is the provision of a device of this character which can be readily applied and detached and which will not interfere with the easy riding of the tire and which will be of extremely simple and inexpensive construction to insure an efficient and practical improvement of this character.

With these objects in view, my invention consists of the tire chain or guard embodying novel features of construction and combination of parts substantially as disclosed herein.

Figure 1 represents a side elevation of a sufficient portion of a tire with my chain or guard applied thereto. Fig. 2 represents a perspective view of one of the sections or members of the device to show its peculiar construction, and Fig. 3 represents a perspective view of the novel form of adjustable connection for the free ends of the chain or guard.

In the drawings: The letter A designates a portion of the tire to which my chain or guard is applied and the said chain or guard comprises the series of curved members B, which are of a shape to snugly fit upon the tire and are tapered in form and provided with the flanged edges C, and by means of the tapering form and the arrangement of the flanges when the tire passes over the surface the effect is to cause the first flange to engage the surface and force the second or rear flange into the surface which is a very important feature and constitutes a point of merit of my device, as this construction causes the members to dig or bite into the surface and prevent slipping, whereas if the flanges were in a vertical instead of a tapered or inclined relation such flanges would slide over the surface and not prevent slipping.

The series of members are connected by the links D and to connect the ends of the chain and to secure the chain upon the tire, I use the novel device shown in Fig. 3, which consists of the loop E, which engages the rim and has its ends riveted at F to the pair of links G, which links at one end are provided with hooks H, engaging pins J on the end member K, and to the other end of said links are fulcrumed at L, the pair of levers M, which are formed with openings N to engage the pins O on the other or meeting end member P. These levers are secured in place by means of the fastening Q, secured to the end of the levers and passing around the rim.

In use, the device is applied to the tire and the series of members fit snugly in place and are secured upon the tire by the adjusting devices and it is evident that in passing over the ground the chain will give sufficiently but the plates or members by reason of their peculiar form, will bite into the surface and prevent slipping.

It is also apparent that my device can be quickly applied or removed and easily adjusted to suit the tire, and that it is of comparatively light weight but possesses the proper strength and durability to withstand hard usage and that all things considered, the device will prove entirely efficient and practical for the purpose intended.

I claim:—

1. In combination with a tire, the guard or chain consisting of the series of gripping members, links flexibly connecting the members, and means for connecting the meeting ends of the chain and securing the chain upon the tire, said means consisting of a pair of links having hooks at one end to engage one set of end members, a loop connected to said links to engage the tire rim, and a pair of levers fulcrumed to the other end of said links and having open recesses to engage pins on the other member of the chain at the meeting end.

2. In combination with the end members of a chain or guard provided each with lateral pins, a pair of links having hooks to engage the pins on one member, a pair of levers fulcrumed to the other ends of the links and having recesses to engage the pins on the other member, and means pivotally carried upon the rear ends of the hook carrying links and passing around the rim of the wheel for securing the links and levers in position for use.

In testimony whereof I affix my signature in presence of two witnesses.

OLE J. MIKKELSON.

Witnesses:
 FAY COPSEY,
 A. C. BOLSTER.